(12) United States Patent
Kapuschat et al.

(10) Patent No.: US 10,380,521 B2
(45) Date of Patent: Aug. 13, 2019

(54) PREDICTING SERVICE FOR INTRUSION AND ALARM SYSTEMS BASED ON SIGNAL ACTIVITY PATTERNS

(71) Applicant: TYCO INTEGRATED SECURITY LLC, Boca Raton, FL (US)

(72) Inventors: Jason Kapuschat, Churchville, NY (US); Tyrene Townsley, Deland, FL (US); Manorani Joseph, Lexington, MA (US); Nicholas Yu, Rochester, NY (US)

(73) Assignee: TYCO INTEGRATED SECURITY LLC, Boca Raton, FL (US)

( * ) Notice: Subject to any disclaimer, the term of this patent is extended or adjusted under 35 U.S.C. 154(b) by 418 days.

(21) Appl. No.: 15/173,775

(22) Filed: Jun. 6, 2016

(65) Prior Publication Data

US 2017/0351787 A1    Dec. 7, 2017

(51) Int. Cl.

| | |
|---|---|
| *G06F 17/50* | (2006.01) |
| *G06Q 10/06* | (2012.01) |
| *G08B 29/04* | (2006.01) |
| *G08B 29/02* | (2006.01) |
| *G08B 31/00* | (2006.01) |

(52) U.S. Cl.
CPC ....... *G06Q 10/06312* (2013.01); *G08B 29/02* (2013.01); *G08B 29/04* (2013.01); *G08B 31/00* (2013.01)

(58) Field of Classification Search
CPC .................................................. G06F 17/5022
USPC ............................................................ 703/13
See application file for complete search history.

(56) References Cited

U.S. PATENT DOCUMENTS

| | | | |
|---|---|---|---|
| 9,013,294 B1* | 4/2015 | Trundle | G08B 25/001 340/501 |
| 10,044,857 B2* | 8/2018 | Philbin | G08B 25/016 |
| 2007/0209075 A1* | 9/2007 | Coffman | H04L 63/14 726/23 |
| 2010/0262411 A1* | 10/2010 | Nasle | G05B 23/0254 703/13 |

* cited by examiner

*Primary Examiner* — Andy Ho
(74) *Attorney, Agent, or Firm* — Foley & Lardner LLP (57) ABSTRACT

A work order prediction system is described. The work order prediction system analyzes retrieved sensor signal activity records to compare counts of signal activity in defined signal groupings to corresponding predetermined thresholds of sensor signal activity and generates a report based on the comparison when sensor signal activity exceeds the determined threshold values. The predetermined thresholds of sensor signal are determined for each signal grouping by comparing corresponding groupings of service record activity against determined counts of historical sensor signal activity to establish threshold values for each of the groupings and produce a model based on the comparison of the historical sensor signal activity to service activity.

16 Claims, 6 Drawing Sheets

PREDICTING SERVICE FOR INTRUSION AND ALARM SYSTEMS BASED ON SIGNAL ACTIVITY PATTERNS

BACKGROUND

This description relates to maintenance of security systems such as intrusion detection and fire monitoring systems.

It is common for businesses and homeowners to have a security system for detecting alarm conditions at their premises and signaling the conditions to a monitoring station or to authorized users of the security system. Security systems often include a panel that is electrically or wirelessly connected to a variety of sensors. Those sensors typically include motion detectors, cameras, and proximity sensors (used to determine whether a door or window has been opened). Other types of security systems include access control and surveillance systems typically used by commercial businesses.

Service products such as "MAStermind" (United Technologies, Inc.) help service customer work orders. For a typical service request on a security system, a service dispatch center in a physical location produces a work order upon receipt of a customer complaint. The complaint can be regarding a false alarm or an issue with the respect to any of the devices or panels installed in their premises. Dispatch center personnel produce the work order request using the service product and schedules a technician to visit the site.

SUMMARY

The problem with this type of servicing when applied to intrusion detection and alarm security systems is that a technician and service truck are sent to the customer premises for almost every line item in the job and can involve an average more than one dispatch per job. In addition to more dispatches, other problems also arise such as finding the right technicians for the job, having the right parts in the service truck and isolating the problem quickly. Excess truck dispatches have other consequences such as environmental and health and safety issues because of excessive truck dispatches (more vehicle emissions and increased risk of road accidents). Jobs that take longer to complete can erode a security business's service contract profit margins. Other qualitative issues that can arise include, unsatisfied customers and technicians because of ad-hoc scheduling of service calls with the wrong technician skills or inadequate equipment/supplies needed to complete a job.

According to an aspect, a work order prediction system includes one or more server computers each comprising a processor device, memory in communication with the processor device, and a storage device, the work order prediction system further configured to retrieve historical sensor signal activity from a database, analyze the historical sensor signal activity to determine counts of signal activity according to defined groupings, retrieve from the database historical service activity, compare corresponding groupings of service record activity against determined counts of historical sensor signal activity to establish threshold values for each of the groupings, and produce a model based on the comparison of the historical sensor signal activity to service activity.

The following are some additional features within this aspect.

The groupings are Event ID class groupings. The system analyzes historical job details for a customer site and generates the model that predicts future jobs within a limited time frame that can be expected for the customer site.

According to an additional aspect, a work order prediction system includes one or more server computers each comprising a processor device, memory in communication with the processor device, and a storage device, the work order prediction system further including an analysis engine that retrieves records from a database, which records include sensor signal activity counts for a particular installed system for a particular customer account and compares the sensor signal activity to predetermined thresholds of sensor signal activity and a report generator that generates a report based on the comparison in the analysis engine when sensor signal activity exceeds the determined threshold values.

The following are some additional features within this aspect.

The analysis engine analyzes sensor signal activity over a defined period of time. The defined period of time is within a range of a prior number of days between 30 days and 120 days measured from the date on which the analysis occurs. The analysis engine determines systems that have sensor signal activity over a defined period of time for each event group. The analysis engine determines for system whether the system had a service job over a period of time longer than the defined period used for sensor signal activity, and removes those systems that had a service job over the longer period of time from the generated report. The analysis engine the generated report is a list of accounts and service job counts over the defined time period.

Aspects also include a computer implemented method for work order prediction and a computer program product tangibly stored on a computer readable hardware storage device including executable instructions for work order prediction.

The above techniques can be used to provide predictions of what jobs will occur in the near future at a customer site based on historical jobs. In addition to notifying dispatch personnel about a predicted job, the techniques provides the dispatcher with details about the predicted job, thus helping a dispatcher to properly plan and prepare to schedule a technician's visit to the customer site.

The details of one or more embodiments of the invention are set forth in the accompanying drawings and the description below. Other features, objects, and advantages of the invention is apparent from the description and drawings, and from the claims.

DETAILED DESCRIPTION

Figure 1:
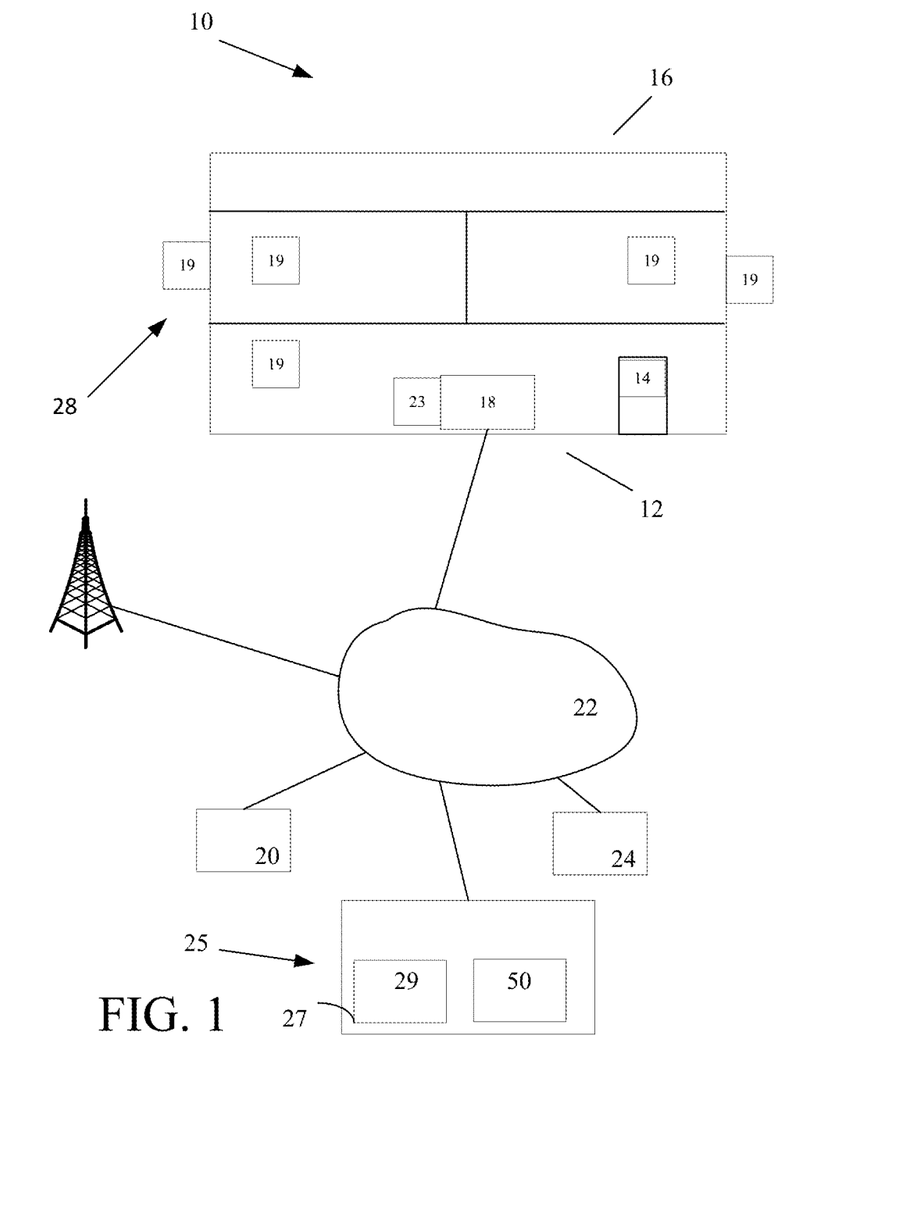
FIG. 1 is a schematic diagram of an example security system at a premises.

Referring now to FIG. 1, an example application 10 of a security system in particular an intrusion detection system 12 and access control system 14 installed at a premises 16 is shown. In this example, the premises 16 is commercial premises, but the premises may alternatively be any type of premises or building, e.g., residential, industrial, etc. The intrusion detection system 12 includes an intrusion detection panel 18, and sensors/detectors 19 disbursed throughout the premises 16. The intrusion detection system 12 is in communication with a central monitoring station 20 (also referred to as central monitoring center) via one or more data or communication networks 22 (only one shown), such as the Internet; the phone system or cellular communication system being examples of others. The intrusion detection panel 18 receives alarm data signals from plural detectors/sensors (generally referred to as 19) that send to the intrusion detection panel 18 information about the status of the monitored premises. As used herein alarm data or alarm signals refer to signals that as sent from sensors in an alarm system to a monitoring center. For instance, alarm data or alarm signals can originate from a glass break detector or a contact/proximity switch in an alarm system upon an occurrence of a window being broken or a door opening or a sensor fault condition.

Signals from various types of sensor/detectors (terms used interchangeably herein) can be used especially those types of sensors/detectors that produce a binary type signal (assertion/non-assertion of a condition being sensed). The detectors 19 may be hard wired or communicate with the intrusion detection panel 18 wirelessly. In general, detectors 19 sense glass breakage, motion, gas leaks, fire, and/or breach of an entry point, and send the sensed information to the intrusion detection panel 18. Based on the information received from the detectors 19, the intrusion detection panel 18 determines whether to trigger alarms, e.g., by triggering one or more sirens (not shown) at the premises 16 and/or sending alarm messages to the monitoring station 20.

A user may access the intrusion detection panel 18 to control the intrusion detection system, e.g., disarm the intrusion detection system, arm the intrusion detection system, enter predetermined settings, etc. The access can be made directly at the premises 16, e.g., through a keypad 23 connected to the control panel, through a remote device 24, etc.

The data or communication network 24 may include any combination of wired and wireless links capable of carrying packet and/or switched traffic, and may span multiple carriers, and a wide geography. In one embodiment, the data network 22 may simply be the public Internet. In another embodiment, the data network 22 may include one or more wireless links, and may include a wireless data network, e.g., with tower (not referenced) such as a 2G, 3G, 4G or LTE cellular data network. The panel 16 may be in communication with the network 22 by way of Ethernet switch or router (not illustrated). The panel 16 may therefore include an Ethernet or similar interface, which may be wired or wireless. Further network components, such as access points, routers, switches, DSL modems, and the like possibly interconnecting the panel 16 with the data network 22 are not illustrated.

Also shown in FIG. 1 is a dispatch center 25. The dispatch center 25 includes personnel stations (not shown), a server(s) system 27 running a service fulfillment program 29 that populates a database (not shown) with historical data and a service alert prediction system (prediction system) 50.

Figure 2:
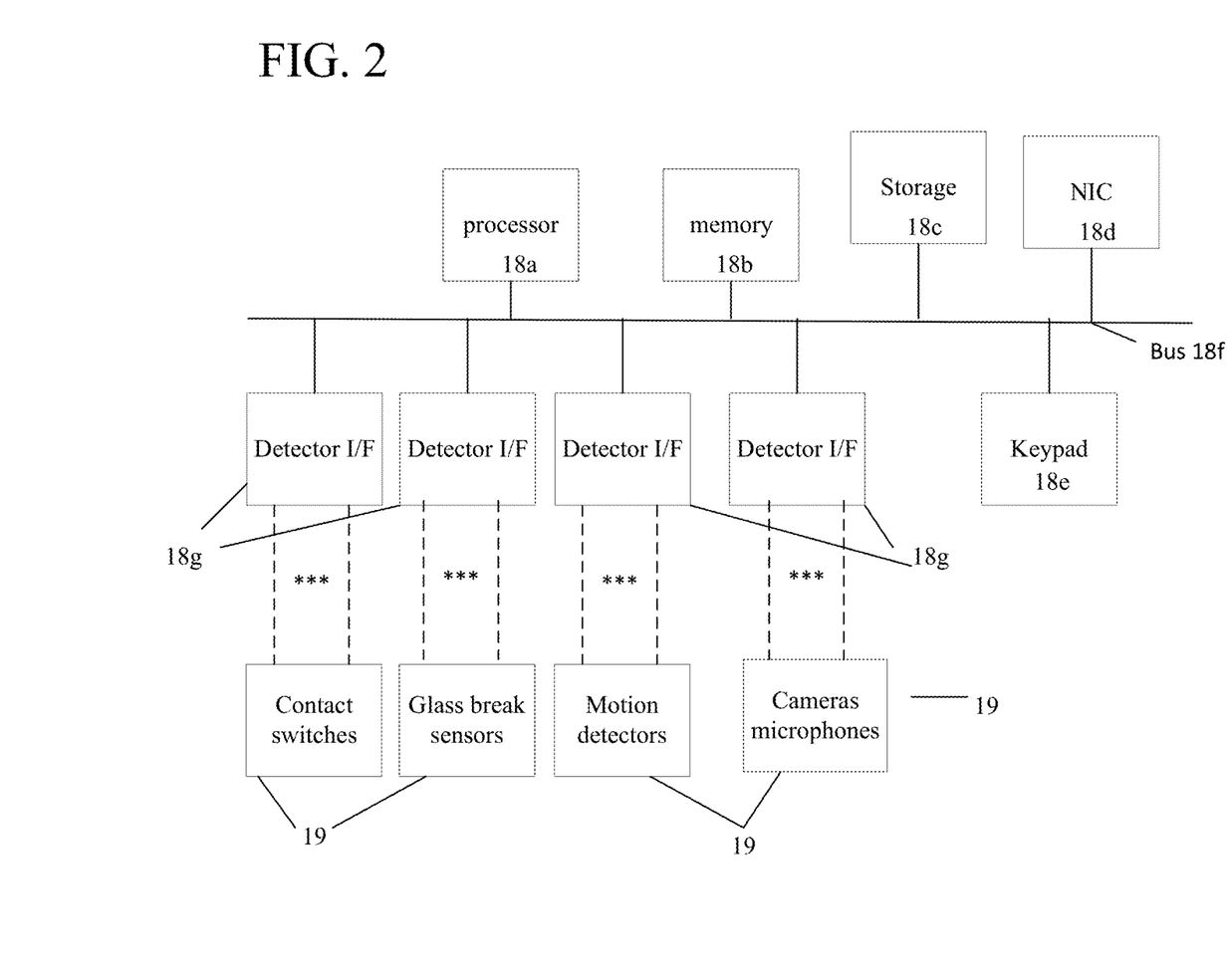
FIG. 2 is a block diagram of an intrusion detection panel.

Referring now to FIG. 2, details on an exemplary intrusion detection system including the panel 18 are shown. The intrusion detection panel 18 includes processor 18a and memory 18b, storage 18c, a key pad 18d and a network interface card (NIC) 18e coupled via a bus 18f. The intrusion detection panel 18 also includes one or more interfaces 18g to receive sensor data from the various sensors 19. Illustrated for explanatory purpose are detector interfaces 18g for contact switches, glass break sensors motion detectors, cameras and microphones. Others may be included.

Figure 3:
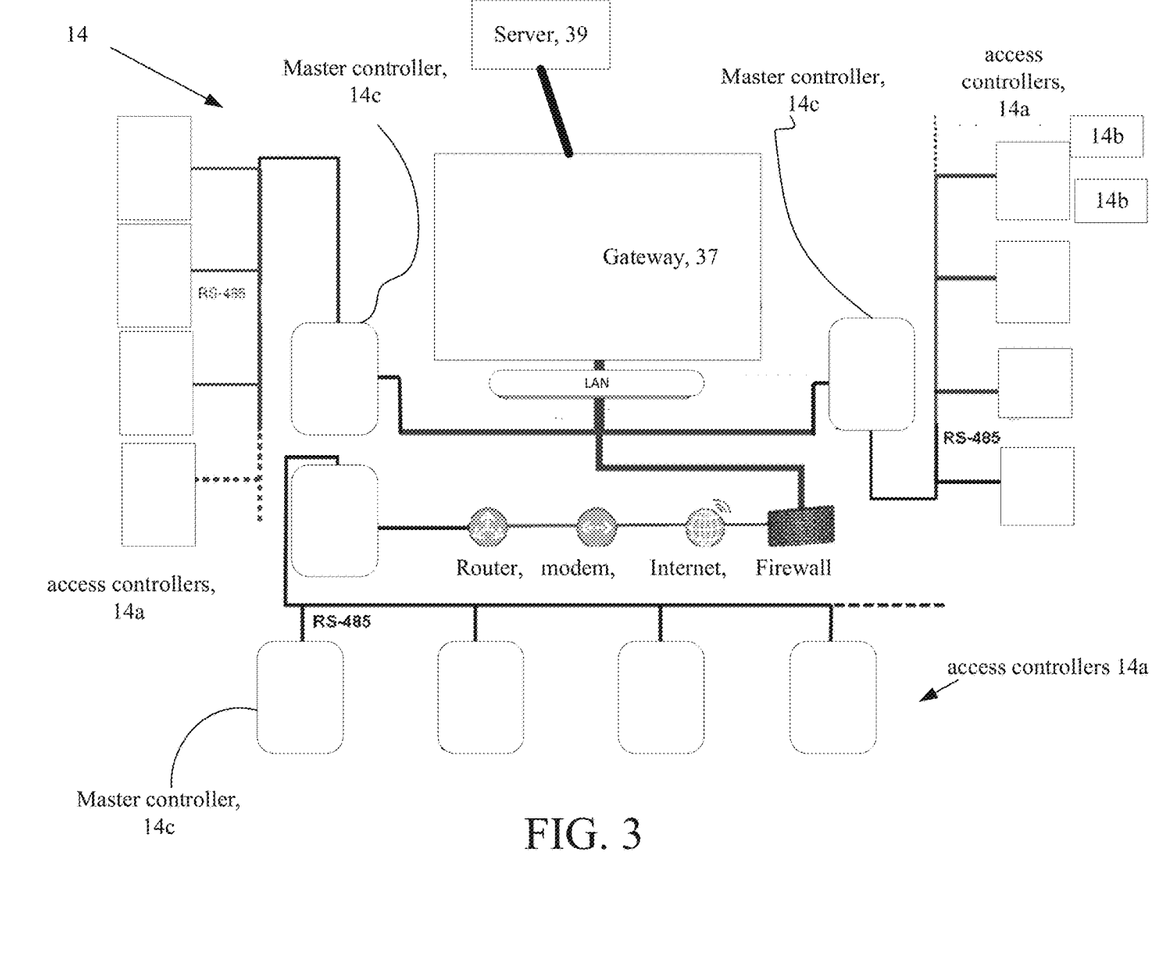
FIG. 3 is a block diagram showing an example of an access control system.

Referring now to FIG. 3, the access control system 14 is shown. Access control systems can be installed in residences but are more commonly installed in businesses. For example, a room (not shown) has a doorway and has associated therein an access controller 14a and one or two card readers 14b, (e.g. an ingress card reader and an egress card reader) with door locks (not shown) controlled by the access controller. The access control system 14 can include a plurality of access controllers 14a and associated card readers 14b.

During installation of the access control system 14, the access controllers 14 are configured by a technician according to operational requirements. The access control system 14 also includes a gateway 15a that is coupled to the access controllers 14a via one or more master controllers 14c, as shown. The access control system 14 also includes a LAN, router, modem, the Internet and cellular or serial communications and a firewall, as illustrated, and a server 15b that is coupled to the gateway 15a.

FIGS. 1-3 are examples of security/intrusion/alarm/access control systems.

Figure 4:
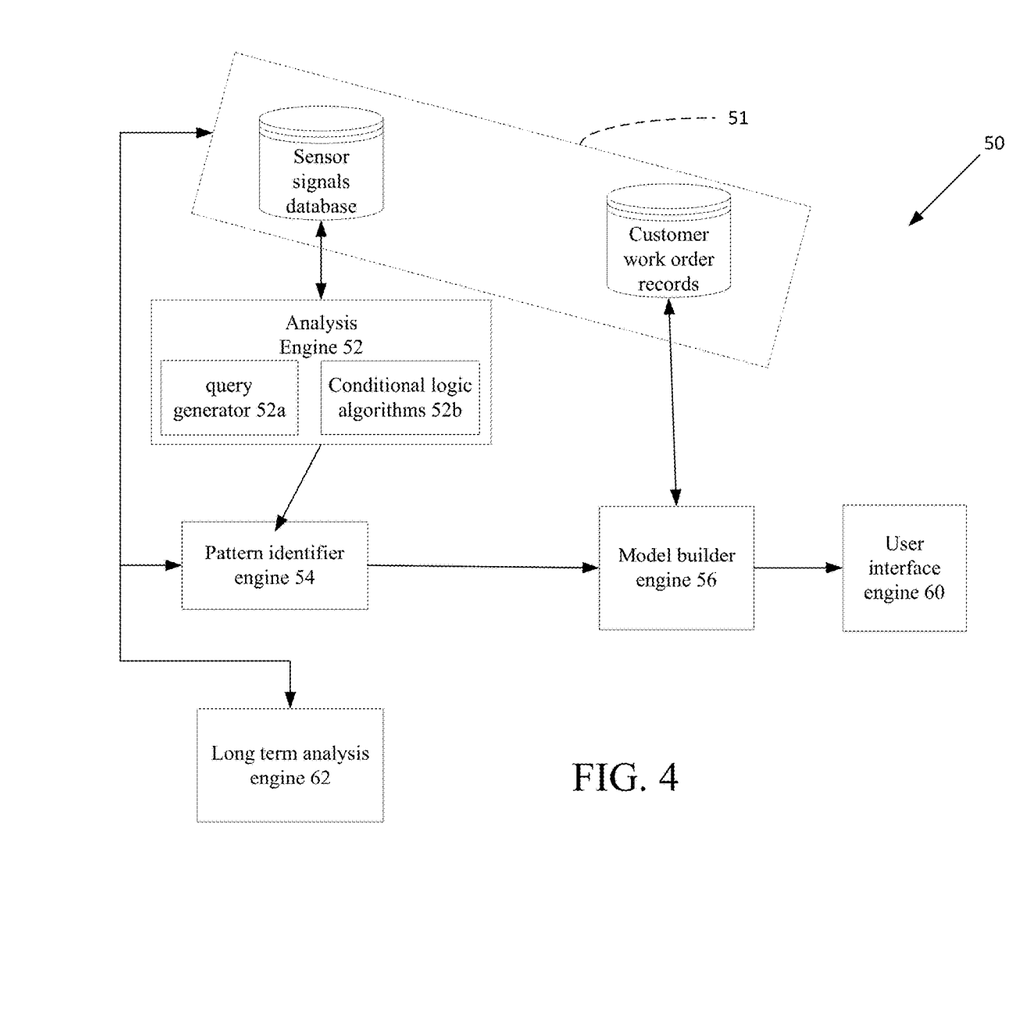
FIG. 4 is a block diagram of a prediction system.

Referring now to FIG. 4, the prediction system 50 is shown. The prediction system 50 includes one or more server computers either dedicated server computers or cloud server computers and database(s) 51 that store sensor signal events or alarm events (discussed below). The central monitoring system 20 collects these sensor data on a per site, per customer, per system/model basis and stores this data in database(s) 51 for access by the prediction system 50. The database also stores customer work order records. The prediction system 50 accesses such sensor signal data, e.g., sensor activations from sensors at installed systems/devices at customer premises in order to predict potential service issues in advance of customers contacting service providers for service.

At a high level, the prediction system 50 sends queries for sensor data stored in the database 51 and analyzes historical sensor data using conditional logic algorithms to build or discover identifying points within the alarm data produced from applicable systems. The built or discovered identifying points are referred to herein as "flickers" or "flicker points" and correspond to data elements within a system type (i.e., installed systems/devices at customer premises) that lead the prediction system 50 to generate notifications of predictions of service events. More particularly, a flicker point is a threshold value for each individual grouping, which is derived from a difference between an upper and lower limit of counts of for the particular grouping and is a variance of sensor signal occurrences (signal activity), per grouping. The variance between the upper and lower values of assertions is used to determine a threshold for the respective group. That is from the variance a threshold for each group can be defined. When signal activity breaches the threshold for a particular group, then the occurrence is extracted from the data set and presented to a technical support agent to start identifying an issue before a customer requests service.

The prediction system 50 thus includes an analysis engine 52 that sends queries via query generator 52a for sensor data stored in the database 51. The analysis engine analyzes this historical sensor data and groups this data into groupings and generates counts of sensor signals across customer accounts over a period of time.

The prediction system 50 also includes a pattern identifier engine 54 that is used to discover identifying points within the sensor data produced from applicable systems. The prediction system 50 analyzes alarm data assertions on a customer account basis to discover identifying points. The analysis seeks to determine existence of large variations in volume of activity between low activity and high activity instances of alarm data assertions. A relatively large variation (or variance) difference between for a customer account can be an indicator of potential need for service. The discovered identifying points are referred to herein as "flicker points" and correspond to determined data element thresholds within a system type (i.e., installed systems/devices at customer premises) that will lead the prediction system 50 to generate notifications of predictions of service events.

The pattern identifier engine 54 identifies and uses the identified "flicker points" by analyzing the grouped historical signal activity data for customer accounts that coincide with service jobs in comparison with those customer accounts that did not coincide with service jobs. From the pattern identifier engine 54, a model builder engine 56 builds SQL logic based models and produces algorithms to execute against current daily data from sites to produce daily (or periodic) outputs that technical support agents review and may take action on through a user interface generated by user interface engine 60. The prediction system 50 can also include an analysis module 62 that conducts analysis to discover long-term patterns in the queried sensor data.

In one implementation, the prediction system is configured with a set of thresholds for each of the groupings of alarm data (or alarm signals) and the prediction system 50 queries the database for instances of activity that are higher than the threshold set within the SQL query for each grouping over a defined period of time, e.g., the past 24 hours or previous 30 day period, etc. The prediction system constantly sends these queries to query the database.

The prediction system 50 extracts these "flickers" in sensor signal activity, i.e., alarm data (or alarm signals) in order to obtain actionable data pertaining to specific types of installed equipment at customers' premises and to generate a model that can predict future jobs within a specified time frame, which can be expected for a specific type of installed equipment on a particular customer site.

Sensor signal activity are signals generated by sensors that are part of intrusion detection, fire, burglar, surveillance and other types of alarm type systems. Such sensor signals can be the actual signals received directly from the sensors or messages generated by the respective intrusion detection, fire, burglar surveillance, etc., systems, which messages are based on actual sensor signals received by the respective systems.

Examples of a sensor signal is a signal received for instance from contact sensor, e.g., on a door in a customer premises, that generates a signal state that indicates when a door is open or when a door is closed. Other examples, could be a message generated by an access controller, a signal generated by motion detector, a signal generated by a chemical sensor, or a smoke detector, etc.

Figure 5:
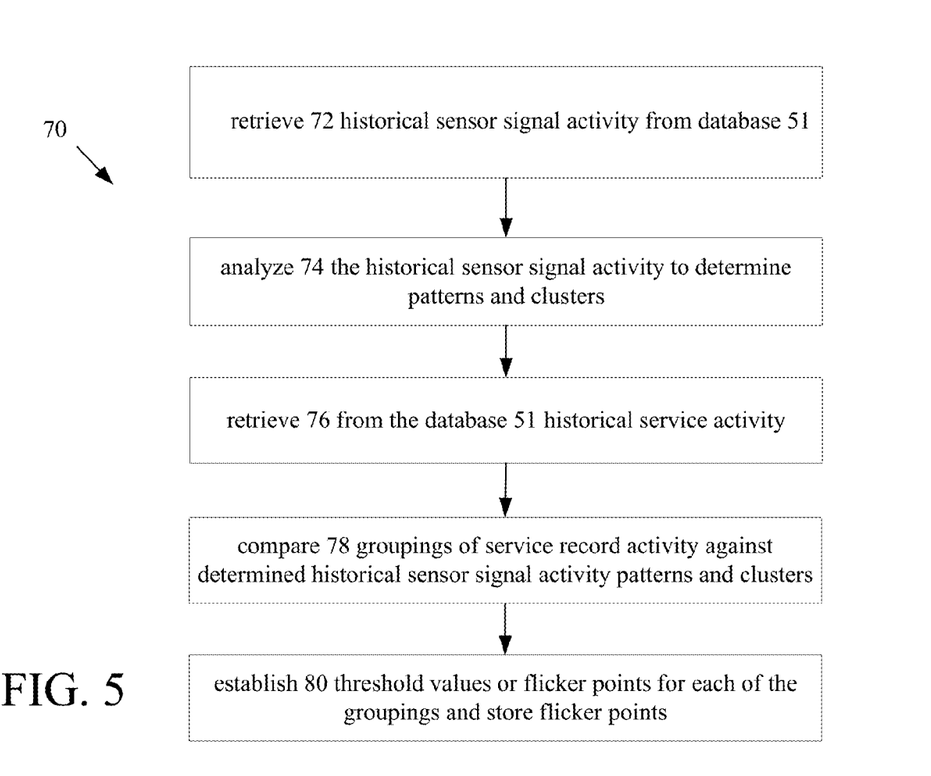
FIG. 5 is a flow diagram of an example flicker algorithm.

Referring now to FIG. 5, initial processing 70 by the prediction system 50 is shown. In this initial processing, the prediction system 50 retrieve 72 historical sensor signal activity from database 51 and analyzes 74 the historical sensor signal activity to determine patterns and clusters into Event ID class groupings as discussed below. The processing 70 groups the signal activity according to, e.g., customer accounts (or could be according to site) and Event ID class groupings. For example one type of grouping could be grouping according to fire alarm type signals, another type could be burglar alarm signals, etc., and obtains counts of signal activations for each bucket.

Grouping alarm data or alarm signal assertions by alarm system type, e.g., fire alarm type signals, burglar alarm type signals, etc. is used so as to control analysis to estimate a number of assertions of these alarm data or alarm signals lead a service request for each individual bucket (alarm system type) because one type of an alarm system could generate a very high number of assertions before the system actually needs service, whereas, another type of alarm system could generate relatively few assertions to be indicative of the issue or problem on the system that requires service. Thus each grouping in general does not have the same threshold level of assertions to be flagged as a potential service issue.

The processing 70 also retrieves 76 from the database 51 historical service activity. The processing 70 compares 78 groupings of service record activity against determined historical sensor signal activity patterns and clusters and establishes 80 threshold values or flicker points for each of the groupings. The prediction system 50 produces a model 78 that is based on the comparison of the historical sensor signal activity to service activity using the identified "flicker points" on per customer or per site basis.

Figure 6:
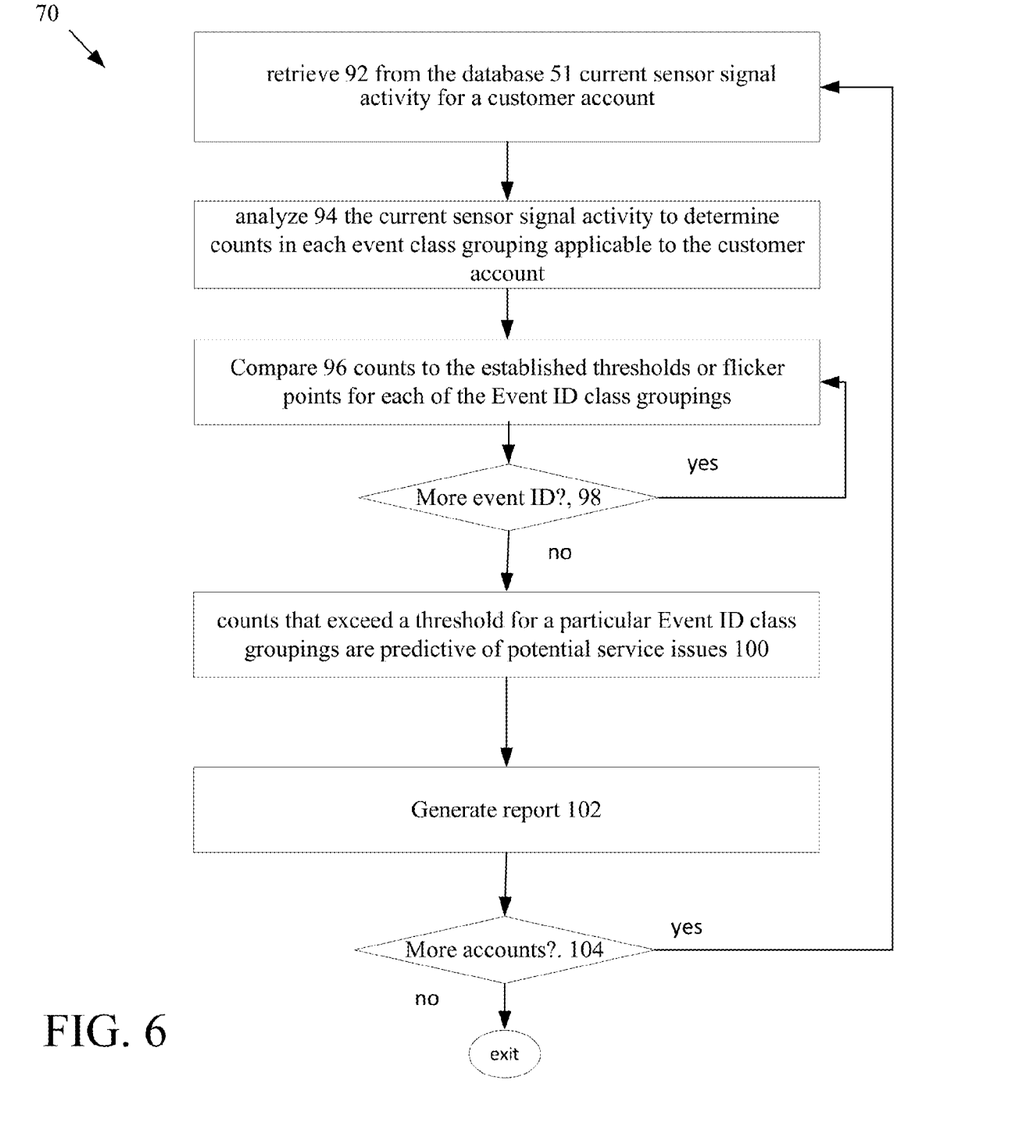
FIG. 6 is a flow diagram of an example recommendation engine.

Referring now to FIG. 6, processing 90 by the prediction system 50 using the flicker points determined in the modeling process is shown. The prediction system 50 retrieves 92 from the database 51 current sensor signal activity on a per customer account (or other) basis. The prediction system 50 analyzes 94 the current sensor signal activity to identify an existence of "flicker points" in any of the on per customer or per site basis by determining counts of current sensor signal activity for each of the Event ID class groupings where these counts are for normal activity and signal event activity.

The processing 90 groups the signal activity according to Event ID class groupings for a customer account (or could be according to a customer site) and determines counts of such activity that occurred over a period of time, e.g., daily using a 30 moving average or other period. These counts of signal activity in each of the Event ID class groupings for a particular customer account (or customer site) are compared 96 to the established thresholds or flicker points, discussed above, which are generated for each Event ID class grouping. Those counts that exceed 100 a threshold for a particular Event ID class groupings by a specified amount are considered as predictive of potential service issues. The processing 90 generates 102 a report of these Event ID class groupings that exceeded the threshold for each customer account examined, and can include other information that will be used by a customer service representative to contact a customer and/or schedule a service call or other technical support. If there are more accounts 104 these can be processed, if not the process can exit or can restart and run continuously.

Thus, the prediction system 50 is provided with predefined segmentations of system activity, e.g., Event ID class group, as in Table I below. These names and groupings are examples only and other systems/implementations could and likely would use different groupings and/or grouping names.

TABLE 1

| Event ID class group | name |
|---|---|
| BA | burglar alarm |
| FA | fire alarm |
| TR | trouble signal |
| Bypass | Bypass |
| CC | critical condition supervisory |
| CF | communication failure |
| HU | hold up |
| LB | low battery |
| MA | medical |
| SU | supervisory |
| TA | tamper |
| CM | carbon monoxide |
| CL | Close signal |

In this example, the above groupings can include signal type activity that are not necessarily prefixed in the system.

For each customer account, for instance, the prediction system 50 retrieves signal activity according to the grouping and determines an amount of signal activity for each grouping. The prediction system 50 reduces this data to an amount of signal activity that corresponds to a fixed, empirically determined amount. For example, the prediction system 50 reduces each signal group to retain a portion of the activity for each segment, e.g., the top 5% or the top 10% or the top 20%, up to about the to 33% of activity for each group within a fixed period of time. Of course, higher or lower retention percentages could be used, the trade-off being server processing expenditures for diminishing returns on higher percentages, vs. inadequate capture of "flickers" i.e., anomalies, based on sampling of data at lower percentages.

Using the top 10% of activity for each segment, the following exemplary data could be obtained, as signal activity on a per day basis for each of these groupings, as shown in Table 2, below. The prediction system 50 generates an output as in Table 2, which is dynamic and is based on the historical signal output variations of the customer account over the fixed period, e.g., day over day (fictitious data used for explanatory purposes only).

TABLE 2

| Event ID class group | Filtered count | Group name |
|---|---|---|
| BA | 47 | burglar alarm |
| FA | 18 | fire alarm |
| TR | 737 | trouble signal |
| Bypass | 326 | Bypass |
| CC | 42 | critical condition supervisory |
| CF | 247 | communication failure |
| HU | 27 | hold up |
| LB | 48 | low battery |
| MA | 19 | Medical |
| SU | 34 | Supervisory |
| TA | 8 | Tamper |
| CM | 10 | carbon monoxide |
| CL | See below | Close signal |

Analyzing historical signal activity for patterns and clustering can use machine learning algorithms but the above described grouping process for various signal types can also be used.

A mathematical variance (i.e., a difference between high and low alarm data (alarm signal) assertion activity is determined for each top level grouping, e.g., customer account. Two exemplary variances (fictitious data used for explanatory purposes only) are shown below for an event class ID "CL" that corresponds to "Close signal" which indicates that the system, i.e., an alarm system has been "armed."

Table 3 is an example of a customer account without any service jobs over a defined period of time. Table 3 is exemplary of a control account, a profile of what would normally be expected as variation in differences between upper and lower values of instances of a CL event class on a periodic basis here day to day. Table 3 shows a lower variance (simple difference) between normal activity and signal events.

TABLE 3

| Date | UCL | LCL | Difference |
|---|---|---|---|
| Day 1 | 1.17 | 0.88 | 0.29 |
| Day 2 | 13.3 | 7.2 | 6.7 |
| Day 3 | 4.65 | 0.39 | 4.26 |
| Day 4 | 22.1 | 10.36 | 11.45 |
| Day 5 | 1.52 | 0.64 | 0.88 |
| Day 6 | 94.4 | 7.5 | 86.9 |

Table 4 is an example of another customer account with service jobs over another defined period of time (five days). Table 4 is exemplary of a customer account, a profile of what can be considered as abnormal unexpected variation in differences between upper and lower values of instances of the CL event class on a periodic basis here day to day. Table 4 shows a higher variance (simple difference) between normal activity and signal events.

TABLE 4

| Date | UCL | LCL | Difference |
|---|---|---|---|
| Day 1 | 295.7 | 98.6 | 199.1 |
| Day 2 | 425 | 193 | 232 |
| Day 3 | 425 | 197 | 228 |
| Day 4 | 430 | 185 | 245 |
| Day 5 | 422 | 188 | 234 |

The prediction system 50 determines "normal" variations in each of the event classes that occur in customer accounts, covering a statistically significant period of time, e.g., 30 days or more. From these tables the prediction system 50 uses these various sensor signal activations from installed devices to predict potential service issues in advance of a customer contacting for repair by derived potential repair recodes from results of querying sensor data using conditional logic built into SQL algorithms that are applied to identified systems. These identifications points are referred to as "Flickers" or data within the system that leads the prediction system 50 signal a technician or service representative to action. The prediction system 50 determines significant correlations between signal activity and propensity of service job requests.

Reporting involves applying by the prediction system reporting over a defined period of time. Thus, the prediction system 50 extracts e.g., the prior 30 day signal activity, i.e., alarm data (or alarm signals) for each event group that is tracked by the prediction system 50 for all customer accounts. The prediction system 50 summarizes the signal activity, i.e., alarm data (or alarm signals) by customer system (i.e., installed hardware/software/sensor combination that provides a unique burglar, fire, intrusion, etc. alarm system) to obtain the alarm count within each event group for the respective customer system. The prediction system 50 identifies those customer systems that have alarm counts of 30 day signal activity, i.e., alarm data (or alarm signals) that exceed threshold counts for each event group. The prediction system 50 determines for each customer system whether the customer system had a service job over a period of time longer than the period used for alarm activity, e.g., in last 90 days or 120 days or other time periods for the event group, and if so removes the customer system from a report that the prediction system 50 generates. For example, if a "BA Flicker" is identified and the customer system already had a "BA Remote job" in last 90 days then that can be removed from the daily report. This feature can be included in order to avoid addressing those customer systems that are already being addressed based on the above prediction system 50.

For reporting, a "System and Bypass Flickers Date File" is generated with accounts that exceed threshold. This file includes system identification number, Site address, Event Group, Alarm Count, Count of service jobs in last 30 days, Count of Remote Service jobs in last 30 days.

For reporting, an additional File, a "Flicker Svc. Job Count over Last 30 Days" is generated to list all the flicker accounts and their service job counts over the last 30 days from a snapshot date. Example, customer system 1 is identified as Flicker in a Mar. 1, 2015 report, and which will be listed with the count of service jobs between Feb. 1, 2015 and Mar. 1, 2015. This file serves as a master file because it has all the systems that are identified as flicker at one instance.

For reporting, an additional File, "Svc. Jobs Date" can be generated to list the Service Job number and job detail for the flicker accounts. Only Service Jobs produced within the first 30 days of the Flicker Date for the system is included in the file. The Flicker Date is the date when the system exceeded the threshold count for the Event Group. This file is optional.

The prediction system 50 for each day, queries the database to review all event signal activity for each predefined group. When any group breaches the predefined threshold, as determined above, the prediction system 50 produces an output flicker report.

By determining a threshold level of signal activity for which a service job request may be likely, i.e., predicted to occur over a specific time frame, e.g., 1 week, 1 month, etc., the prediction system 50 proactively produces flicker reports that are reviewed by service representatives that can contact the customer to attempt to resolve a potential problem or the prediction system 50 can order a dispatch of a service technician before the customer's system becomes inoperable, thus reducing or eliminating any potential customer system down time.

An exemplary view of a record that can be retrieved from the database is shown below. This view is included to illustrate that for each customer account (field Account) there can be one or more systems (represented by System id in field System) and which system id is associated with various signals (Signal a to Signal n in field Event ID class group) and which have corresponding filtered counts (Signal a count to Signal n count in field Filtered count).

| Account | System | Event ID class group | Filtered count |
| --- | --- | --- | --- |
| Account i | System id | Signal a | Signal a count |
| | | Signal b | Signal b count |
| | | * | * |
| | | * | * |
| | | * | * |
| | | Signal n | Signal n count |
| Account i + 1 | * | * | * |
| | * | * | * |
| | * | * | * |
| Account n | | | |

Given, recent past jobs, the model produces a list of predicted future jobs. The work order prediction system 50 produces an intuitive user interface that informs dispatch center personnel about why the model predicts a job and also provides details about the job predicted.

Figure 7:
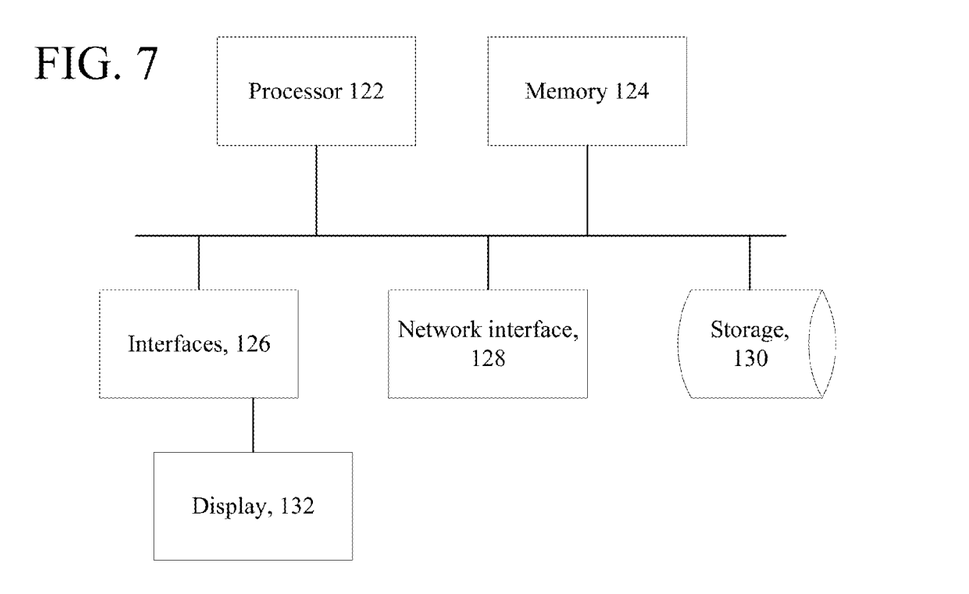
FIG. 7 is a block diagram of a computer system.

As shown in FIG. 7, devices and/or systems as well as servers can be of various types of computing devices capable of receiving and processing information to produce output. Such devices/systems include one or more processors 122, memory 124, interfaces 126 and a network interface 128 coupled via a bus (not referenced). Also included are storage 130 and a display 132. As a server, the system can be a distributed computing system, a rack-mounted server and so forth. Server may be a single server or a group of servers that are at a same location or at different locations. Servers can receive information from client device user device via interfaces. Interfaces can be any type of interface capable of receiving information over a network, such as an Ethernet interface, a wireless networking interface, a fiber-optic networking interface, a modem, and so forth. Server also includes a processor and memory and a bus system including, for example, an information bus and a motherboard, can be used to establish and to control information communication between the components of server.

Processor may include one or more microprocessors. Generally, processor may include any appropriate processor and/or logic that is capable of receiving and storing information, and of communicating over a network (not shown). Memory can include a hard drive and a random access memory storage device, such as a dynamic random access memory computer readable hardware storage devices and media and other types of non-transitory storage devices.

Embodiments can be implemented in digital electronic circuitry, or in computer hardware, firmware, software, or in combinations thereof. Computer programs can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and information from a read-only memory and/or a random access memory. Generally, a computer will include one or more mass storage devices for storing information files; such devices include magnetic disks, such as internal hard disks and removable disks; magneto-optical disks; and optical disks. Storage devices suitable for tangibly embodying computer program instructions and information include all forms of non-volatile memory, including by way of example semiconductor memory devices, such as EPROM, EEPROM, and flash memory devices; magnetic disks such as internal hard disks and removable disks; magneto-optical disks; and CD ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Other embodiments are within the scope of the following claims, for instance, given, recent past jobs, the prediction system could produce a list of predicted future jobs based on the flicker data rather than having the need for a technician to analyze the flicker point data produced by the prediction system. The prediction system would produce an intuitive user interface to inform dispatch center personnel about why the prediction system predicts a specific job and could provide details about the job predicted.

What is claimed is:

1. A work order prediction system, comprising:
   one or more server computers each comprising a processor device, memory in communication with the processor device, and a storage device, the work order prediction system configured to:
   retrieve historical sensor signal activity from a database;
   analyze the historical sensor signal activity to determine counts of the historical sensor signal activity according to defined groupings;
   retrieve from the database historical service activity;
   compare groupings of the historical service activity against determined counts of the historical sensor signal activity to establish threshold values for each of the groupings;
   produce a model based on the comparison of the historical sensor signal activity to the historical service activity; and
   execute the model on periodic current signal activity data retrieved from the database for a customer site to predict future jobs within a limited time frame that can be expected for the customer site.

2. The system of claim 1 wherein groupings are Event ID class groupings.

3. A computer implemented method for work order prediction, the method comprising:
   retrieving by one or more server computers each comprising a processor device and memory in communication with the processor device from a database records that include historical sensor signal activity for a particular customer site;
   analyzing the historical sensor signal activity to determine counts of the historical sensor signal activity according to defined groupings;
   retrieving from the database historical service activity;
   comparing groupings of the historical service activity against determined counts of the historical sensor signal activity to establish threshold values for each of the groupings;
   producing a model based on the comparison of the historical sensor signal activity to the historical service activity; and
   executing the model on periodic current signal activity data retrieved from the database for a customer site to predict future jobs within a limited time frame that can be expected for the customer site.

4. The work order prediction system of claim 1, wherein the system further comprises:
   an analysis engine that retrieves records from the database, which records include the determined historical sensor signal activity counts for a particular installed system for a particular customer account and compares the historical sensor signal activity to predetermined thresholds of sensor signal activity; and
   a report generator that generates a report based on comparison in the analysis engine when the historical sensor signal activity exceeds the predetermined thresholds of sensor signal activity.

5. The work order prediction system of claim 4 wherein the analysis engine analyzes sensor signal activity over a defined period of time.

6. The work order prediction system of claim 5 wherein the defined period of time is within a range of a prior number of days between 30 days and 120 days measured from the date on which the analysis occurs.

7. The work order prediction system of claim 4 wherein the analysis engine determines customer systems that have sensor signal activity over a defined period of time for each event group.

8. The work order prediction system of claim 7 wherein the analysis engine determines whether the customer systems had a service job over a period of time longer than the defined period used for sensor signal activity; and
   removes the customer systems that had a service job over the longer period of time from the generated report.

9. The work order prediction system of claim 7 wherein the analysis engine generated report is a list of accounts and service job counts over the defined time period.

10. The computer implemented method for work order prediction of claim 3, the method further comprising:
    analyzing by the one or more server computers the retrieved historical sensor signal activity records to compare the determined counts of the historical signal activity in defined signal groupings to corresponding predetermined thresholds of sensor signal activity; and
    generate a report based on comparison when the historical sensor signal activity exceeds the predetermined thresholds of sensor signal activity.

11. The method of claim 10 wherein analyzing of sensor signal activity is over a defined period of time.

12. The method of claim 10 wherein the defined period of time is within a range of a prior number of days between 30 days and 120 days as measured from the date on which the analysis occurs.

13. The method of claim 3 wherein groupings are Event ID class groupings.

14. The method of claim 10 wherein the analysis engine determines customer systems that have sensor signal activity over a defined period of time for each event group.

15. The method of claim 14 wherein the analysis engine determines whether the customer systems had a service job over a period of time longer than the defined period used for sensor signal activity; and
    removes the customer systems that had a service job over the longer period of time from the generated report.

16. The method of claim 14 wherein the analysis engine generated report is a list of accounts and service job counts over the defined time period.

* * * * *